United States Patent [19]

Spirig

[11] 4,263,584
[45] Apr. 21, 1981

[54] REGENERATIVE FEEDBACK INTRUDER ALARM APPARATUS

[76] Inventor: Ernst Spirig, P.O. Box 160, Speerstrasse 14, CH-8640 Rapperswil, Switzerland

[21] Appl. No.: 954,324

[22] Filed: Oct. 24, 1978

[30] Foreign Application Priority Data

May 15, 1978 [GB] United Kingdom ............... 19604/78

[51] Int. Cl.³ ............................................... G08B 13/22
[52] U.S. Cl. ..................................... 340/566; 340/13; 340/515; 340/550; 340/191
[58] Field of Search ............... 340/558, 565, 545, 550, 340/63, 691, 515, 514, 566

[56] References Cited

U.S. PATENT DOCUMENTS

| 3,065,455 | 11/1962 | Roth | 340/558 |
|---|---|---|---|
| 3,721,972 | 3/1973 | Hermans | 340/558 |
| 3,908,180 | 9/1975 | Braginsky | 340/693 |
| 4,086,586 | 4/1978 | Spirig | 340/558 |

Primary Examiner—Glen R. Swann, III
Attorney, Agent, or Firm—Laubscher & Laubscher

[57] ABSTRACT

An intruder alarm apparatus is disclosed for protecting a building or a vehicle and consuming a minimal amount of energy when in "watch" condition. An acoustic transmitter is placed inside (or outside) a closed space being supervised, an acoustic receiver is placed outside (or inside) the closed space, and an amplifier has its input connected to the receiver output and its output connected to the transmitter input. If the integrity of the closed space is broken, for example, the enclosing wall is breached, then an acoustic feedback loop is completed by a path being thus established between transmitter and receiver, such that oscillation occurs, and only now are substantial amounts of electrical energy consumed.

15 Claims, 9 Drawing Figures

REGENERATIVE FEEDBACK INTRUDER ALARM APPARATUS

BRIEF DESCRIPTION OF PRIOR ART

This invention relates to an apparatus for producing an alarm when an intruder enters a closed space being supervised.

Known intruder alarms include the ultrasonic systems. However, in all such ultrasonic systems, the ultrasonic transmitter emits ultrasonic waves continuously during the watch periods, or at least for the major portions of such watch periods. For example, in U.S. Pat. No. 3,065,455, an intruder alarm is deliberately arranged so that an ultrasonic transmitter continuously emits ultrasound which is picked up by a receiver and the system permanently oscillates, except when an intruder is interposed between transmitter and receiver thus reducing the loop gain. Accordingly, these systems consume considerable energy during the watch periods. Also, the systems pollute the atmosphere with a considerable amount of ultra-sound. Other types of intruder alarm (non ultra-sonic) also consume considerable energy during the watch periods. The invention particularly aims to provide an intruder alarm apparatus which consumes a minimal amount of energy when in "watch" condition, that is to say, whilst the integrity of the closed space remains unbroken.

SUMMARY OF THE INVENTION

In accordance with this invention, there is provided an intruder alarm for producing an alarm when an intruder enters a closed space being supervised, comprising a transmitter for placing either inside or outside the closed space, a receiver for placing respectively outside or inside the closed space, and an amplifier having its input connected to the receiver output and its output connected to the transmitter input, the arrangement being such that, if the integrity of the closed space is broken, a feedback loop is completed by a path being established between the transmitter and receiver, such that oscillation occurs.

In the watch condition, this apparatus consumes barely any energy. The apparatus may rely upon ultrasonic waves, but in general it may work in all acoustic frequencies propagated by air, whether in the audible or non-audible ranges.

In particular, the apparatus may comprise an adaptation of a car radio or car audio-tape player, to form an intruder alarm protecting the car. Thus, the receiver of the alarm apparatus may comprise a microphone placed outside the passenger compartment and feeding the input to the audio frequency amplifier of the car radio or tape player. The alarm apparatus is completed by the speaker of the car radio or tape player. When a car door is opened or a car window broken, for example, the feedback loop is completed and audible oscillations result. The stages of the radio preceding the audio frequency amplifier may be switched off in the watch condition, and the alarm apparatus relies, for its oscillation in the event of the integrity of the car being broken, upon noise generated in the radio amplifier.

BRIEF DESCRIPTION OF THE DRAWING

Embodiments of this invention will now be described, by way of examples only, with reference to the accompanying drawings, in which.

DETAILED DESCRIPTION

Figure 1:
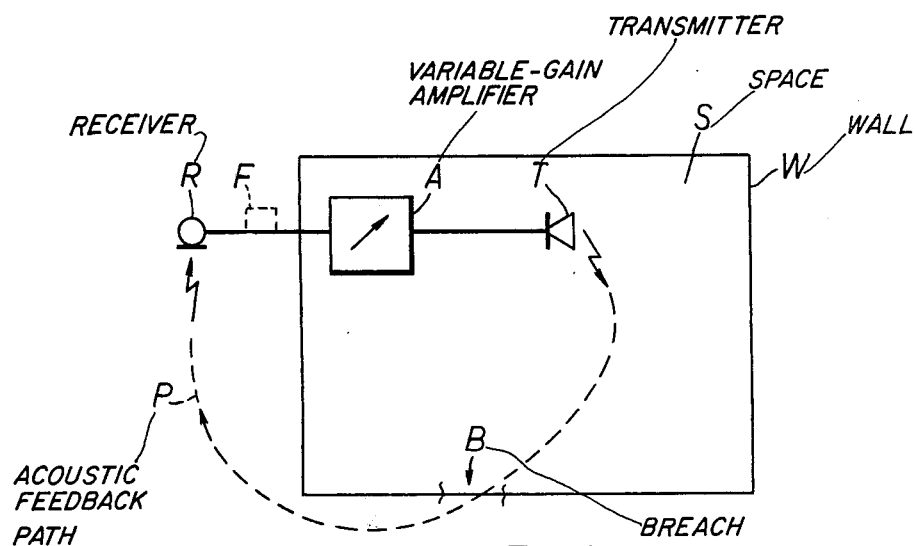
FIG. 1 is a schematic diagram illustrating the principles of an intruder alarm apparatus applied to a closed space to be supervised.

Referring to FIG. 1, a wall W encloses a space S which is to be supervised. A Transmitter T and a variable gain amplifier A are disposed within the closed space S and receiver R is disposed outside. In use, if the wall is breached, for example at B, thus breaking the integrity of the closed space S, then an acoustic feedback path P is established between the transmitter and the receiver. If the gain of the amplifier is appropriately adjusted so that the gain of the loop comprising amplifier A, transmitter T, path P and receiver R is greater than unity, then oscillation will occur. If the integrity of the closed space is maintained, then the wall imposes attenuation on the feedback path P so that oscillation does not occur.

Accordingly, oscillation is indicative of intrusion into the space S to be protected. The gain of the amplifier and the frequency responses of the receiver, amplifier and transmitter may be selected to optimum values in order to improve the detection capability and reliability. These values may be selected according to the physical behaviour of the material of which the wall W is made. Any acoustic frequencies may be chosen, whether in the audible or nonaudible ranges (including ultrasonic).

Figure 2:
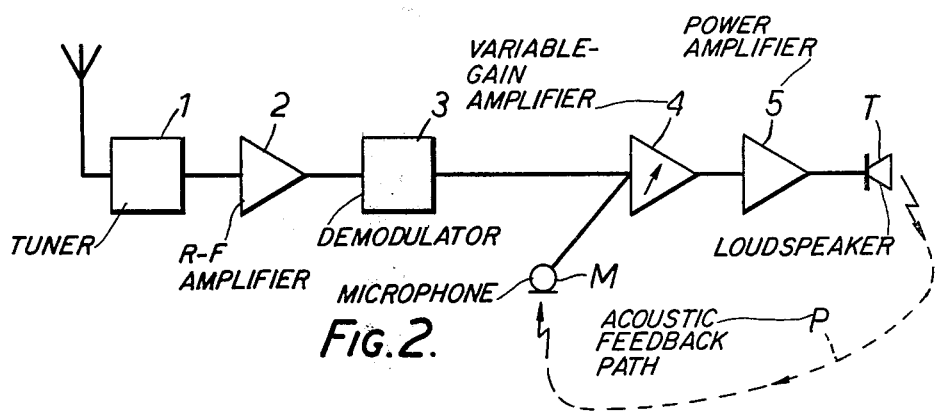
FIG. 2 is a schematic diagram of a car radio modified to be able to act also as an intruder alarm.

The chosen frequencies may be, with advantage, within the audio range handled by a car radio or tape player. FIG. 2 shows, diagrammatically, the various stages of a car radio, comprising tuning circuits 1 with input from the aerial, radio-frequency amplifier 2, demodulator 3, audio-frequency amplifier 4 with variable gain, power amplifier 5 and loudspeaker T. In order to convert this apparatus to be able to act, when required, as an intruder alarm, a microphone M is disposed outside the passenger compartment and is connected to the input of the audio-frequency amplifier 4. In use as an intruder alarm, the electrical power to the preceding stages 1, 2 and 3 is switched off. In normal watch condition, no oscillation occurs but, if the passenger compartment is broken into, an acoustic feedback path is established between the loudspeaker and the microphone and oscillations will occur, producing a siren noise to deter the intruder. The system relies upon the self-generated noise within the audio-frequency amplifier, loudspeaker and microphone and upon any local ambient noise to which the microphone is subjected.

The microphone might be placed in the engine compartment (that is to say, under the bonnet) of the car, the loudspeaker existing within the passenger compartment for the normal radio use. The usual volume control of he radio can be used for setting the gain of the audio frequency amplifier. In watch condition, very little energy will be consumed. The gain must be set sufficiently high so that the opening of a car door or window will initiate the oscillations, whereupon energy will be drawn to drive the loudspeaker.

This invention is not limited to the provision of only a single transmitter, nor to only a single receiver. Also, in some circumstances the transmitter(s) may be outside the space being protected and the receiver(s) inside. In any event, the amplifier may be wholly inside, wholly outside or partially inside and partially outside.

Figure 3:
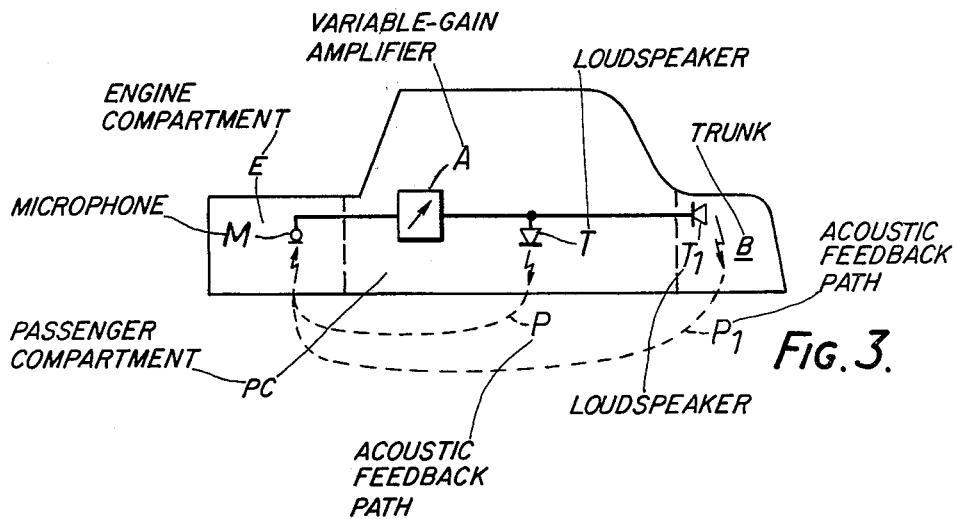
FIG. 3 is a diagram showing a development of the apparatus of FIG. 2 as applied to a car.

FIG. 3 shows an advantageous development of the car radio system of FIG. 2. Thus, an additional loudspeaker $T_1$ is provided in the trunk (or boot) B of the car. A first feedback path P is established between the car loudspeaker T within the car and the microphone M in the engine compartment E when the passenger compartment is broken into. If the trunk is broken into, a second feedback path $P_1$ is established between the loudspeaker $T_1$ and the microphone M. Thus, the simple addition of loudspeaker $T_1$ in the trunk enables the trunk to be protected in addition to the passenger compartment PC. If either trunk or passenger compartment is broken into, both loudspeakers will act as sirens.

Figure 4:
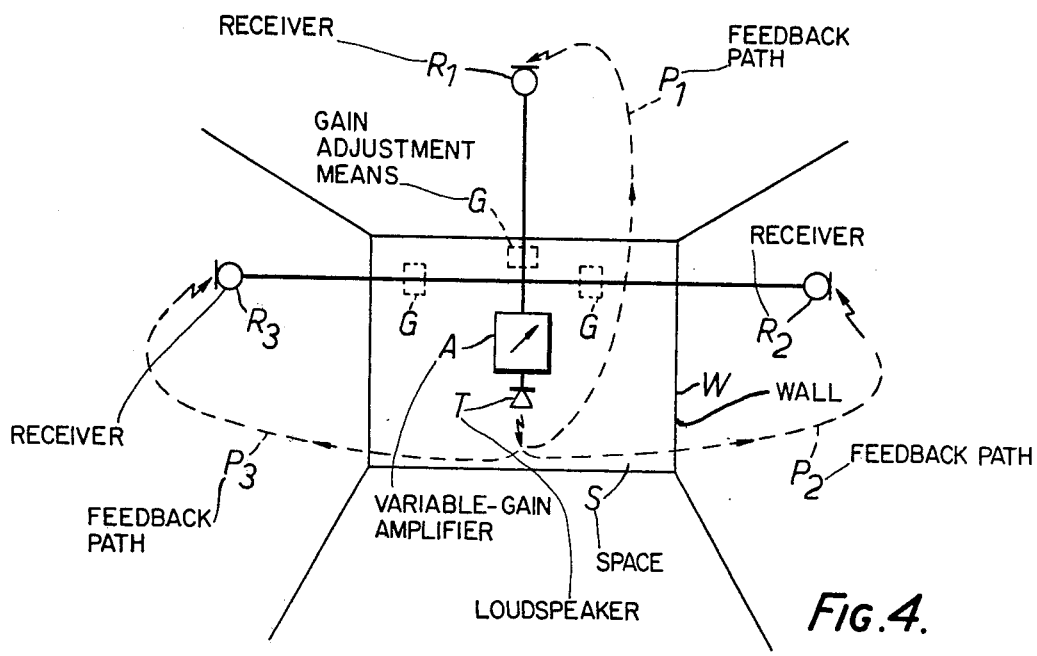
FIG. 4 is a diagram illustrating the use of different feedback paths to distinguish between different zones of breaching.
Figure 7:
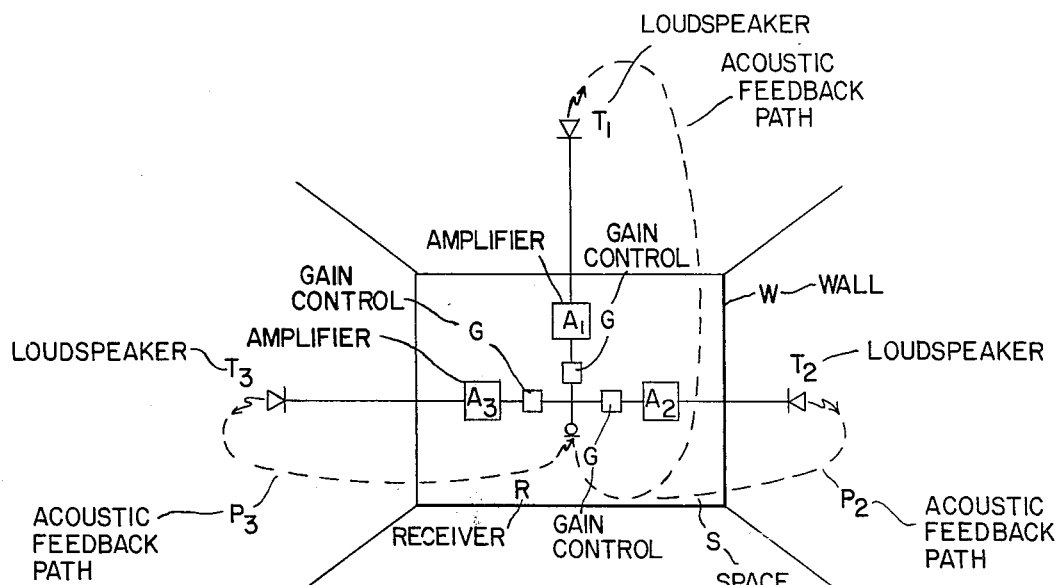
FIGS. 7 and 8 illustrate two further modifications of the system of FIG. 4.
Figure 8:
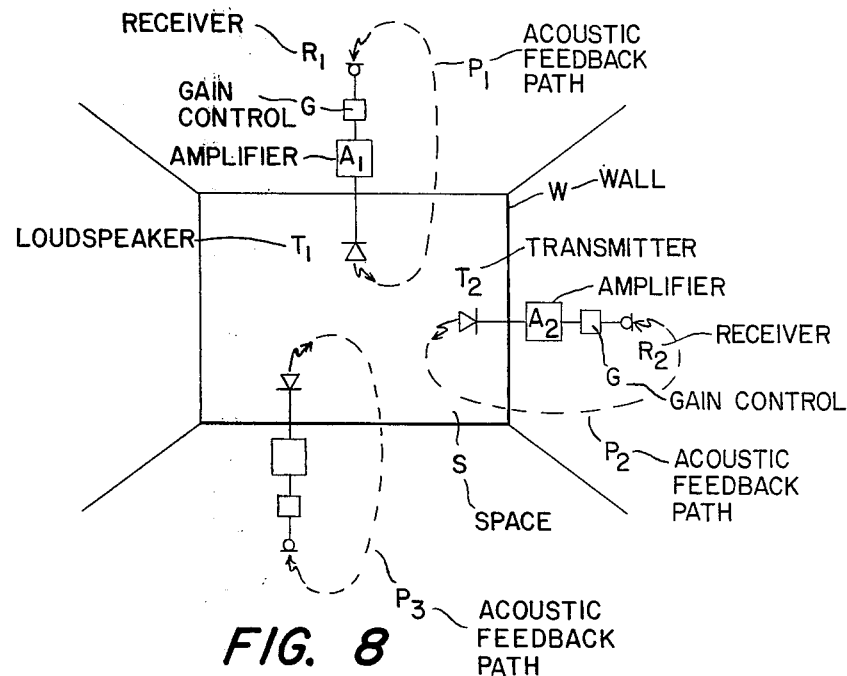

FIG. 4 diagrammatically illustrates a case where different feedback paths $P_1$, $P_2$, $P_3$ are established depending which portion of the wall W is breached. The frequency responses of the different paths may all be different so that the oscillation frequency is different depending which portion of the wall W is breached. It is thus possible to determine the position of intrusion. As one example, the different receivers $R_1$, $R_2$, $R_3$ may be connected through respective amplifiers to a common transmitter placed inside the space S. As another example (shown in FIG. 7), a common receiver R inside space S may feed, through respective amplifiers $A_1$, $A_2$, $A_3$, respective transmitters $T_1$, $T_2$, $T_3$ disposed in respective zones outside the space. In either case, the respective feedback loops may include means G to adjust the amplification factor or gain thereof to adapt to differences in path characteristics, for example where the respective portions of the wall W are of different materials (concrete, brick, steel, for example) and therefore have different attenuation factors. Instead of a one transmitter and a plurality of receivers (or a plurality of transmitters and one receiver), as shown in FIG. 8, a plurality of transmitters $T_1$, $T_2$, $T_3$ and receivers $R_1$, $R_2$, $R_3$ may be provided, one transmitter and one receiver, with one interconnected amplifier $A_1$, $A_2$, $A_3$ for each wall portion.

Figure 5:
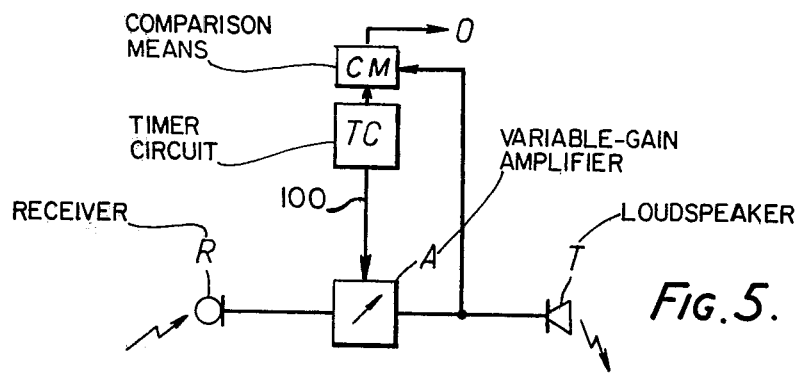
FIG. 5 shows a modification for checking the apparatus in watch condition.

FIG. 5 shows a modification applicable to all embodiments. During the watch condition, a timer circuit TC periodically increases the gain of the amplifier A via conductor 100 to a very high value, for a very short time (a fraction of a second, perhaps a few milliseconds). This value of gain is high enough and persists long enough to cause oscillation, despite no breaching of the enclosing wall. The timer circuit TC is connected with comparison means CM that are arranged to detect whether the oscillations start and stop in proper time relation to the deliberate increase in amplifier gain. If there is a discrepancy, the timer provides an alarm output O indicating intrusion or some tampering with the apparatus.

Figure 6:
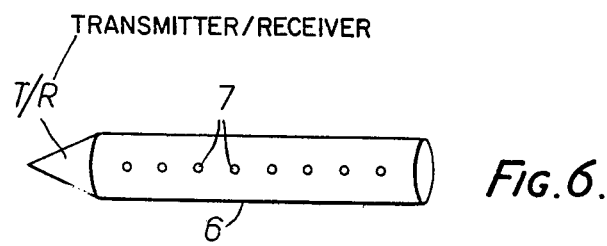
FIG. 6 shows a modified structure for the transmitter or receiver of the above embodiments.
Figure 9:
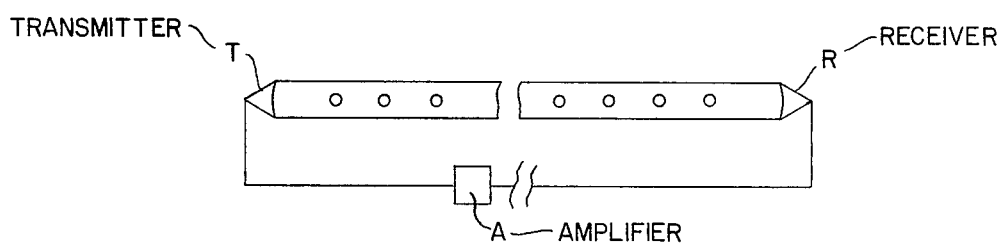
FIG. 9 is a modification of the apparatus of FIG. 6.

Referring to FIG. 6, the or each transmitter or receiver T/R of any of the embodiments may be applied to one end of a sound conductive structure in the form of a pipe 6, which pipe is provided with holes 7 at intervals appropriately spaced along its length for optimum output or input of the acoustic energy at the selected frequency of response for the apparatus. As shown in the modification of FIG. 9, the monitoring receiver may be applied to the pipe in spaced relation to the transmitter and connected thereto via an amplifier arranged so that no oscillation will occur in the loop comprising the transmitter and the receiver unless at least a number of the holes in the pipe are blocked.

The above embodiments of the invention may make use of conventional low frequency electronic circuits, especially the circuits found in car radios and tape players, to form intruder alarms of high efficiency and small cost increases relative to the normal costs of car radios and tape players. Very little energy is consumed in the watch condition and there is no pollution of the environment with acoustic energy during the watch periods. In all embodiments, an indication is readily provided if the alarm apparatus is not ready (for example if a window is left open), in that oscillation will occur immediately the system is switched on.

In general, the alarm apparatus may all be used to protect a car, truck or other vehicle or a fixed building such as a house or apartment or a caravan or a mobile home.

The frequency used may be in the range from very low audio frequency up to and into the ultrasonic range and selected, in part, according to the attenuation factor of the material of the intervening wall. From a practical viewpoint, preferably relatively high frequencies are used because there is usually relatively little ambient noise at high frequencies. Thus, a high frequency pass filter F may be included, as shown in FIG. 1, in the path from the receiver or microphone to the amplifier.

A typical room protection might be provided with the transmitter outside and the receiver inside (or vice versa) and, with the door open to establish a feedback loop through the air, the amplifier gain is increased until the system oscillates. Then if the door is closed, the system should stop oscillating. The gain may be adjusted such that opening the door 2 or 3 inches enables oscillation to start.

In a car or other vehicle, the metal body is generally formed of stamped sheeting, with outer and inner walls spaced apart. Such space may be used as sound conductive means, effectively in the form of the pipe of FIG. 6. Thus, the transmitter could transmit directly into the space for distribution around the car, the inner metal walls being provided with spaced holes to act as distributors into the car interior, or alternatively the receiver may be connected to such space for collection through the holes from the car interior. Such arrangements render it less easy for intruders to disable the system.

For protecting a house, a pipe may run all around the house under the roof, with the transmitter or receiver connected to it. Thus a single transmitter or receiver would work around all corners of the house. The pipe, with its holes, is then effectively sensitive at all zones of the house. An intruder would need to seal off all holes in the pipe in order to disable the system. A monitoring receiver could be positioned at an end of the pipe remote from the transmitter working into that pipe: normally the receiver does not receive sufficient energy to commence oscillation via a gain-adjustable amplifier connected between itself and the transmitter; however, if some of the holes in the pipe are sealed, then the receiver will receive sufficient energy for oscillation to result.

What is claimed is:

1. An intruder alarm apparatus for producing an alarm when an intruder enters a closed space under supervision and enclosed by wall means, comprising a signal loop including transmitter means and receiver means, one said means being inside and the other said means being outside the closed space, respectively, said transmitter means having a signal input and said receiver means having a signal output, and amplifier means having an input connected to the signal output of the receiver means and an output connected to the signal input of the transmitter means, said signal loop having a gain greater than unity for supporting oscillation only when the wall means is breached, thereby breaking the integrity of the closed space.

2. Apparatus as claimed in claim 1, wherein said transmitter means comprises a single individual transmitter within said closed space, said transmitter having an input connected with the output of said amplifier means, and further wherein said receiver means comprises a plurality of individual receivers arranged outside said closed space, said receivers having respective outputs connected with said amplifier input, and further wherein a plurality of respective feedback paths extend from the receivers back to the amplifier means, said wall means comprising separate portions through which the respective feedback paths extend.

3. Apparatus as claimed in claim 2, in which a gain adjusting means is connected between each receiver and the amplifier means.

4. Apparatus as claimed in claim 1, in which said receiver means comprises a single individual receiver within said closed space and said transmitter means comprises a plurality of individual transmitters outside said closed space and all fed by said receiver through said amplifier means, and in which a plurality of respective feedback paths extend from the transmitters to the receiver, said wall means comprising separate portions through which the respective feedback paths extend.

5. Apparatus as claimed in claim 1, wherein said amplifier means comprises a plurality of individual amplifiers having respective inputs and outputs, respectively, wherein said transmitter means comprises a plurality of individual transmitters, one for each amplifier, and wherein the receiver means comprises a plurality of receivers, one for each transmitter, the individual transmitters having respective inputs connected to the said outputs of respective individual amplifiers and the individual receivers having respective outputs connected to the said inputs of respective individual amplifiers, and in which respective feedback paths extend between the transmitters and their respective receivers, said wall means comprising separate portions through which the respective feedback paths extend.

6. Apparatus as claimed in claim 5, in which a gain adjusting means is provided for each receiver.

7. Apparatus as claimed in claim 1, in which the transmitter means includes at least one individual transmitter applied to one end of a sound conductive structure in the form of a pipe provided with holes at intervals along its length.

8. Apparatus as defined in claim 7, and further including a monitoring receiver connected with said pipe in spaced relation relative to said individual transmitter, said monitoring receiver being connected with said individual transmitter via an amplifier arranged to that no oscillation will occur in the loop comprising said individual transmitter and said monitoring receiver unless at least a number of said holes are blocked.

9. Apparatus as claimed in claim 1, in which the receiver means comprises at least one individual receiver applied to one end of a sound conductive structure in the form of a pipe provided with holes at intervals along its length.

10. Apparatus as defined in claim 1, wherein said transmitter means includes a sound conductive structure having apertured wall means defining a hollow space, and at least one transmitter connected with one end of said structure; and further wherein said receiver means includes a sound conductive structure having apertured wall means defining a hollow space, and at least one receiver connected with one end of said sound conductive structure.

11. Apparatus as defined in claim 1, wherein said signal loop includes high pass filter means (F) affording operation of the apparatus at a frequency in the ultrasonic range.

12. An intruder alarm apparatus for producing an alarm when an intruder enters a closed space defined by the wall means of a vehicle, comprising a signal loop including transmitter means and receiver means, said means being one inside and said means being the other of said means being outside the vehicle closed space, respectively, the transmitter means having a signal input and the receiver means having a signal output, and amplifier means having an input connected to the signal output of the receiver means and an output connected to the signal input of the transmitter means, the signal loop having a gain greater than unity for supporting oscillation only when the wall means is breached, thereby breaking the integrity of the closed space.

13. Apparatus as claimed in claim 12, said transmitter means comprising a single individual transmitter within the vehicle passenger compartment and said receiver means comprising a receiver within the vehicle engine compartment.

14. Apparatus as claimed in claim 13, in which said transmitter means comprises a second transmitter in a truck compartment of the vehicle.

15. Apparatus as claimed in claim 12, including a car radio including a low frequency amplifier serving as said amplifier means, and a loudspeaker serving as said transmitter means, said receiver comprising a microphone having an output connected to said low frequency amplifier.

* * * * *